United States Patent
Hsu et al.

(10) Patent No.: US 9,577,319 B2
(45) Date of Patent: Feb. 21, 2017

(54) HOUSING AND ELECTRONIC DEVICE USING SAME

(71) Applicant: Chiun Mai Communication Systems, Inc., New Taipei (TW)

(72) Inventors: Cho-Kang Hsu, New Taipei (TW); Kai-Ting Hung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 132 days.

(21) Appl. No.: 14/559,261

(22) Filed: Dec. 3, 2014

(65) Prior Publication Data
US 2016/0093941 A1      Mar. 31, 2016

(30) Foreign Application Priority Data

Sep. 29, 2014   (CN) .......................... 2014 1 0511261

(51) Int. Cl.
| | |
|---|---|
| *H04M 1/02* | (2006.01) |
| *H01Q 15/00* | (2006.01) |
| *H01Q 1/52* | (2006.01) |
| *H01Q 1/24* | (2006.01) |
| *H04B 1/3888* | (2015.01) |

(52) U.S. Cl.
CPC ................ *H01Q 1/243* (2013.01); *H01Q 1/52* (2013.01); *H01Q 15/0013* (2013.01); *H04B 1/3888* (2013.01); *H04M 1/0202* (2013.01)

(58) Field of Classification Search
CPC ........ H01Q 1/243; H01Q 1/084; H01Q 1/244; H01Q 1/242; H01Q 1/52; H01Q 15/0013; H04B 1/3888; H04B 1/3833; H04M 1/0202; H04M 1/0214; H04M 1/0237; H04M 1/0247; H04M 1/23; H04M 1/0283; H04M 1/18; H05K 5/00–5/069; H05K 7/00–7/2099
USPC ......... 361/600–837; 455/575.1, 575.7, 575.8
See application file for complete search history.

(56) References Cited

U.S. PATENT DOCUMENTS

| | | | | |
|---|---|---|---|---|
| 2008/0174020 A1* | 7/2008 | Ga | ............... | H01L 24/03 257/751 |
| 2010/0328165 A1* | 12/2010 | Hsu | ............... | H01Q 9/26 343/702 |
| 2012/0287018 A1* | 11/2012 | Parsche | ............... | H01Q 1/243 343/897 |
| 2014/0266924 A1* | 9/2014 | Hwang | ............... | H01Q 1/243 343/702 |
| 2014/0361934 A1* | 12/2014 | Ely | ............... | C23C 14/16 343/702 |

* cited by examiner

*Primary Examiner* — Anthony Haughton
*Assistant Examiner* — Yahya Ahmad
(74) *Attorney, Agent, or Firm* — Zhigang Ma

(57) ABSTRACT

A housing includes a conductive metal base, a number of metal patterns, and a number of insulating fillers. The metal patterns are formed on the base and spaced from each other. Each of the plurality of insulating filler is situated between two adjacent metal patterns of the plurality of metal patterns.

11 Claims, 8 Drawing Sheets

HOUSING AND ELECTRONIC DEVICE USING SAME

FIELD

The disclosure generally relates to housings, and particularly to a housing having a metal appearance and a better radiation performance and an electronic device using the housing.

BACKGROUND

Metal housings are widely used in electronic devices such as mobile phones because of the advantages of mechanical strength, resistance to deformation, and tactile sensation. However, the metal housings may shield and interfere with signals radiated by antennas of the electronic devices and negatively influence radiation performance of the antennas.

BRIEF DESCRIPTION OF THE DRAWINGS

Implementations of the present technology will now be described, by way of example only, with reference to the attached figures.

DETAILED DESCRIPTION

Figure 1:
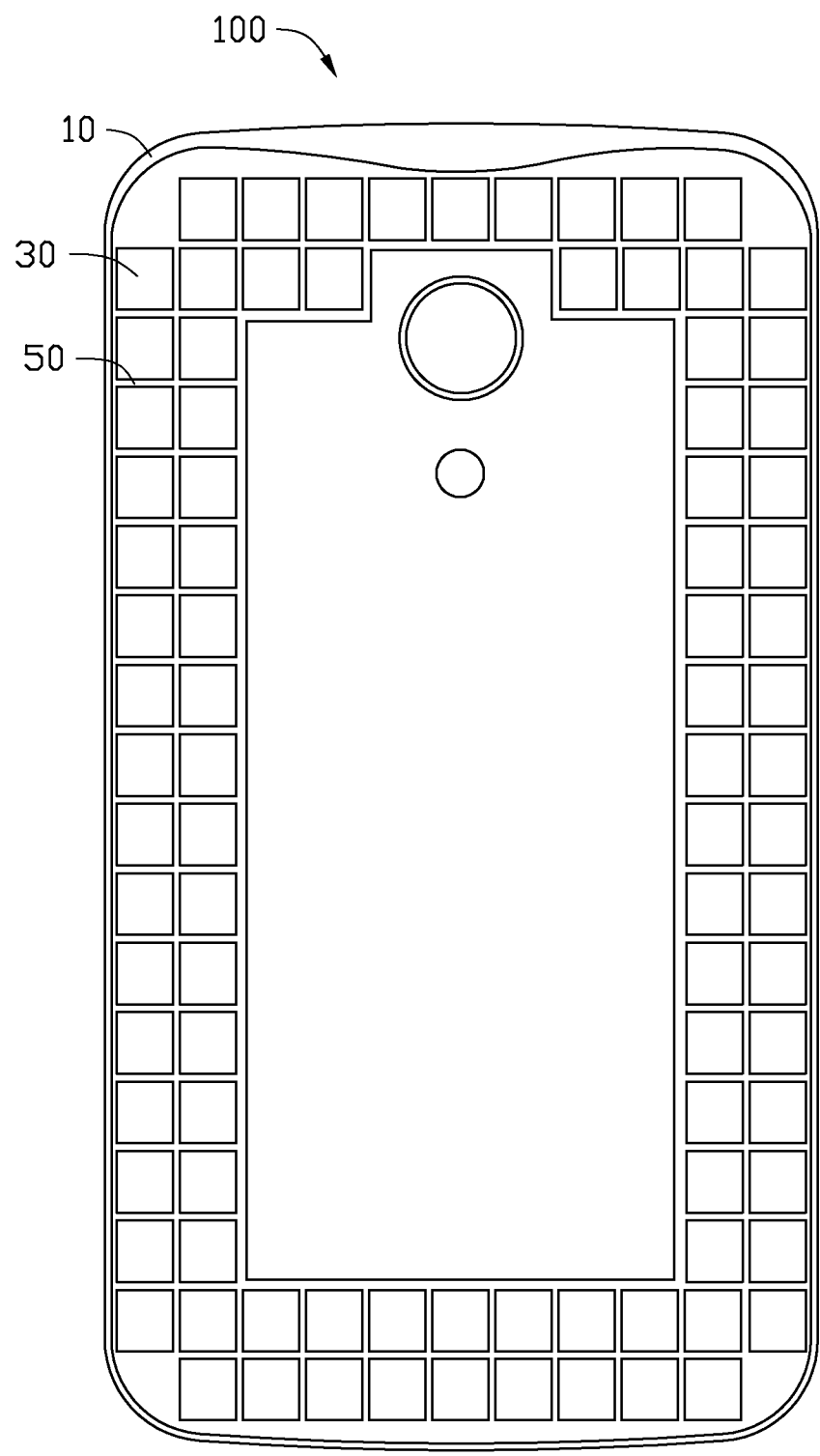
FIG. 1 is a diagrammatic view of a housing, according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a diagrammatic view of a housing, according to a first exemplary embodiment. The housing 100 can be employed to an electronic device 200. The housing 100 includes a base 10 and a plurality of insulating fillers 50 filled into the base 10. The base 10 is made of conductive metal material. A plurality of metal patterns 30 are formed on a first surface of the base 10 via cutting. The metal patterns 30 are spaced from each other. The insulating fillers 50 are filled between every two adjacent metal patterns 30.

Figure 2A:
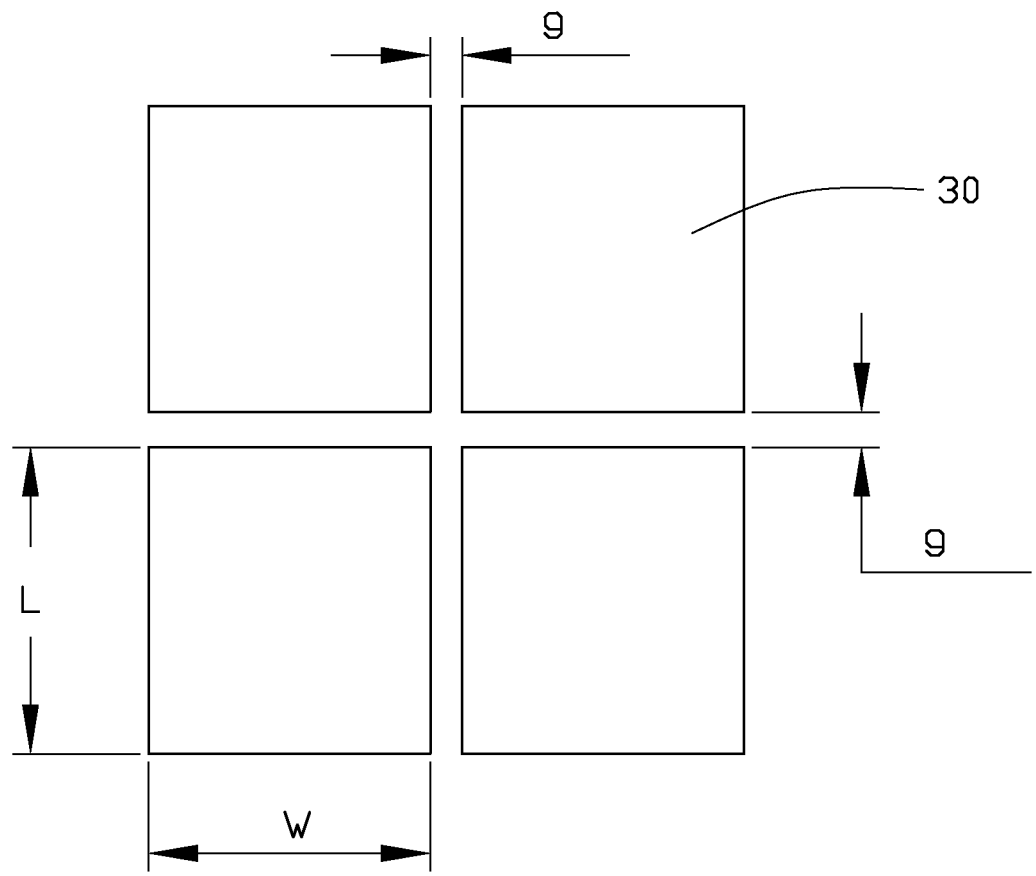
FIG. 2A is a diagrammatic view of dimensions of metal patterns of the housing of FIG. 1, according to a first exemplary embodiment.
Figure 2B:
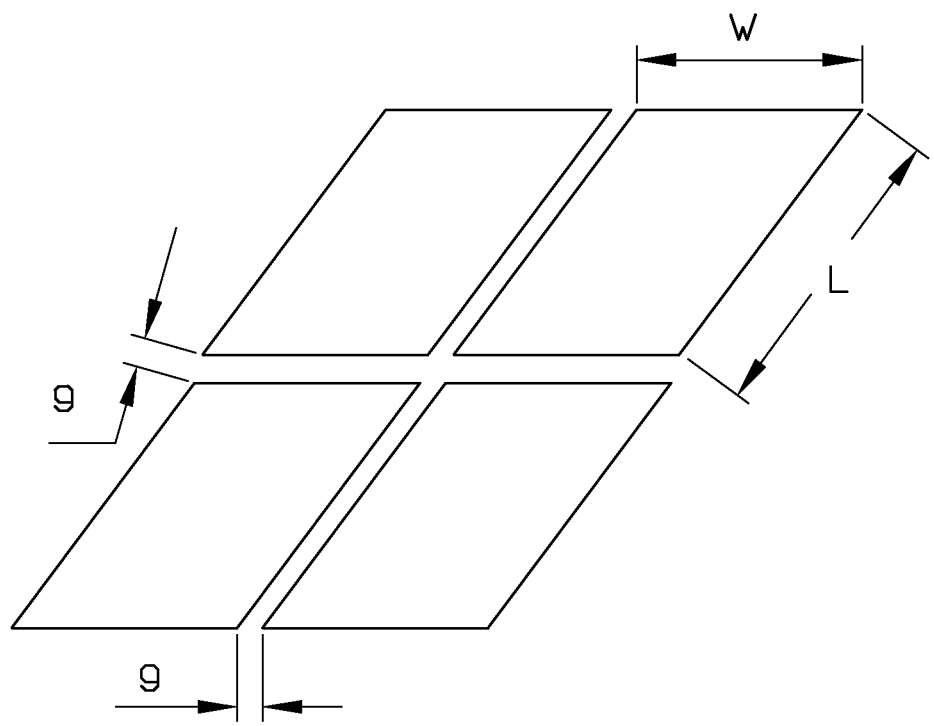
FIG. 2B is a diagrammatic view of dimensions of metal patterns of the housing of FIG. 1, according to a second exemplary embodiment.
Figure 2C:
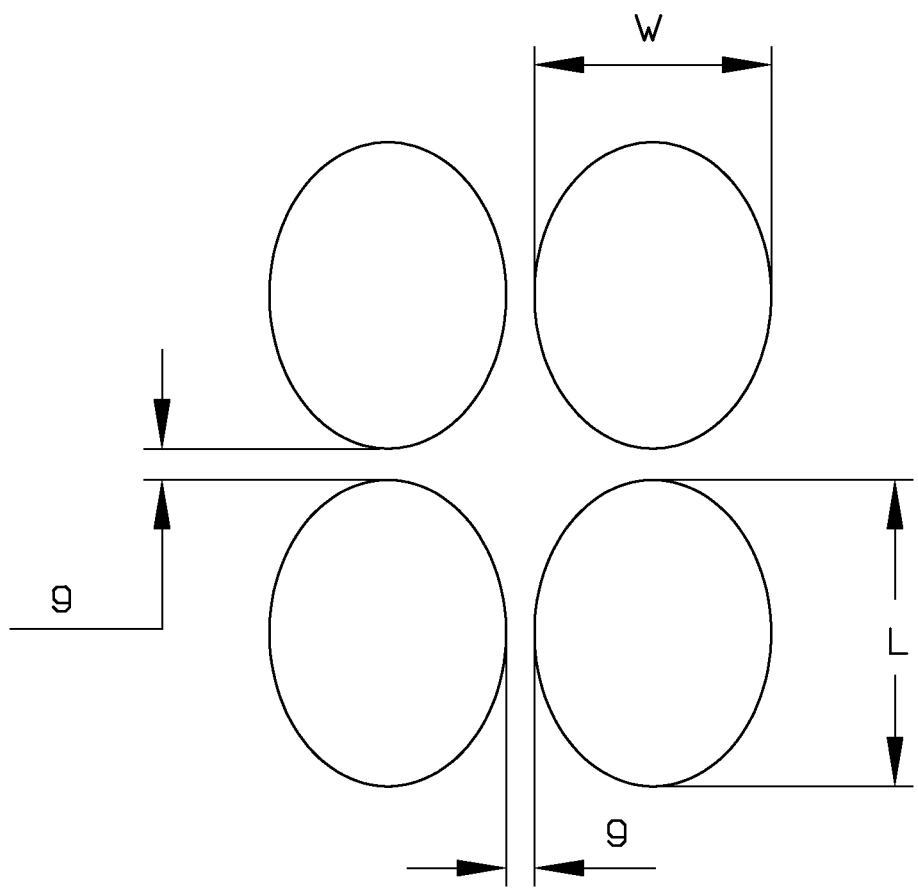
FIG. 2C is a diagrammatic view of dimensions of metal patterns of the housing of FIG. 1, according to a third exemplary embodiment.

FIG. 2A shows that, in an exemplary embodiment, the metal patterns 30 are substantially rectangular. Each metal pattern 30 has a length L and a width W. A gap g is defined between every two adjacent metal patterns 30. A width of the gap g is at least 1 mm. The length L is less than or equal to 15 mm. The width W is less than or equal to 10 mm. In other embodiment, the metal patterns 30 may be other shapes which have equivalent length L and width W, such as parallelograms shown in FIG. 2B and ellipses shown in FIG. 2C.

Figure 3:
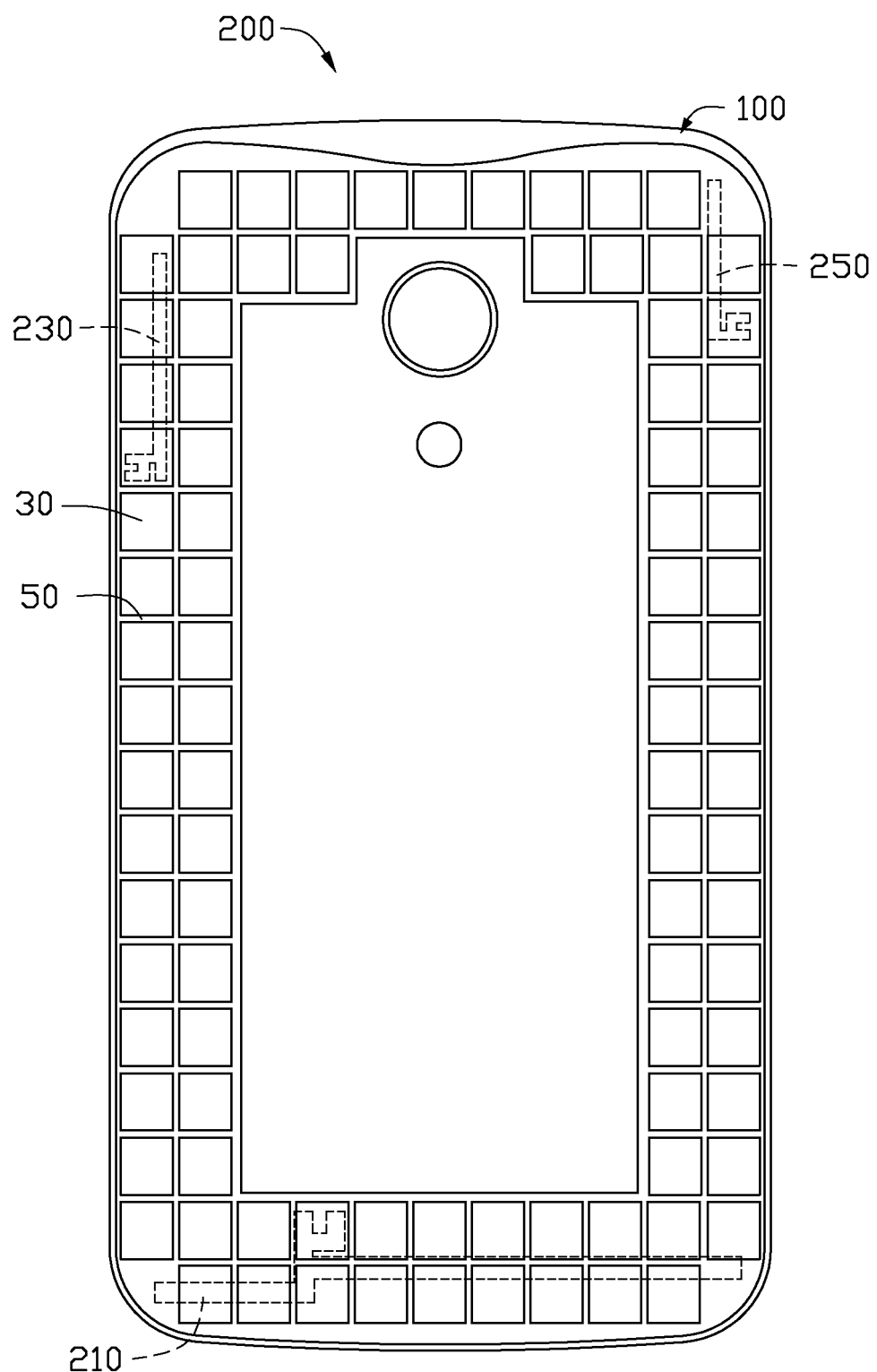
FIG. 3 is a diagrammatic view of an electronic device using the housing of FIG. 1, according to an exemplary embodiment.

FIG. 3 shows a diagrammatic view of the electronic device 200 using the housing 100 of FIG. 1, according to an exemplary embodiment. The electronic device 200 further includes a first antenna 210, a second antenna 230, and a third antenna 250. The first, second, and third antennas 210, 230, 250 are secured to a second surface of the base 10 opposite to the first surface. The first, second, and third antennas 210, 230, 250 are covered by some of the metal patterns 30 and the insulating fillers 50. Therefore, the shielding effect from the housing 100 to the first, second, and third antennas 210, 230, 250 can be reduced and the first, second, and third antennas 210, 230, 250 can obtain relative stable radiation efficiency.

Figure 4:
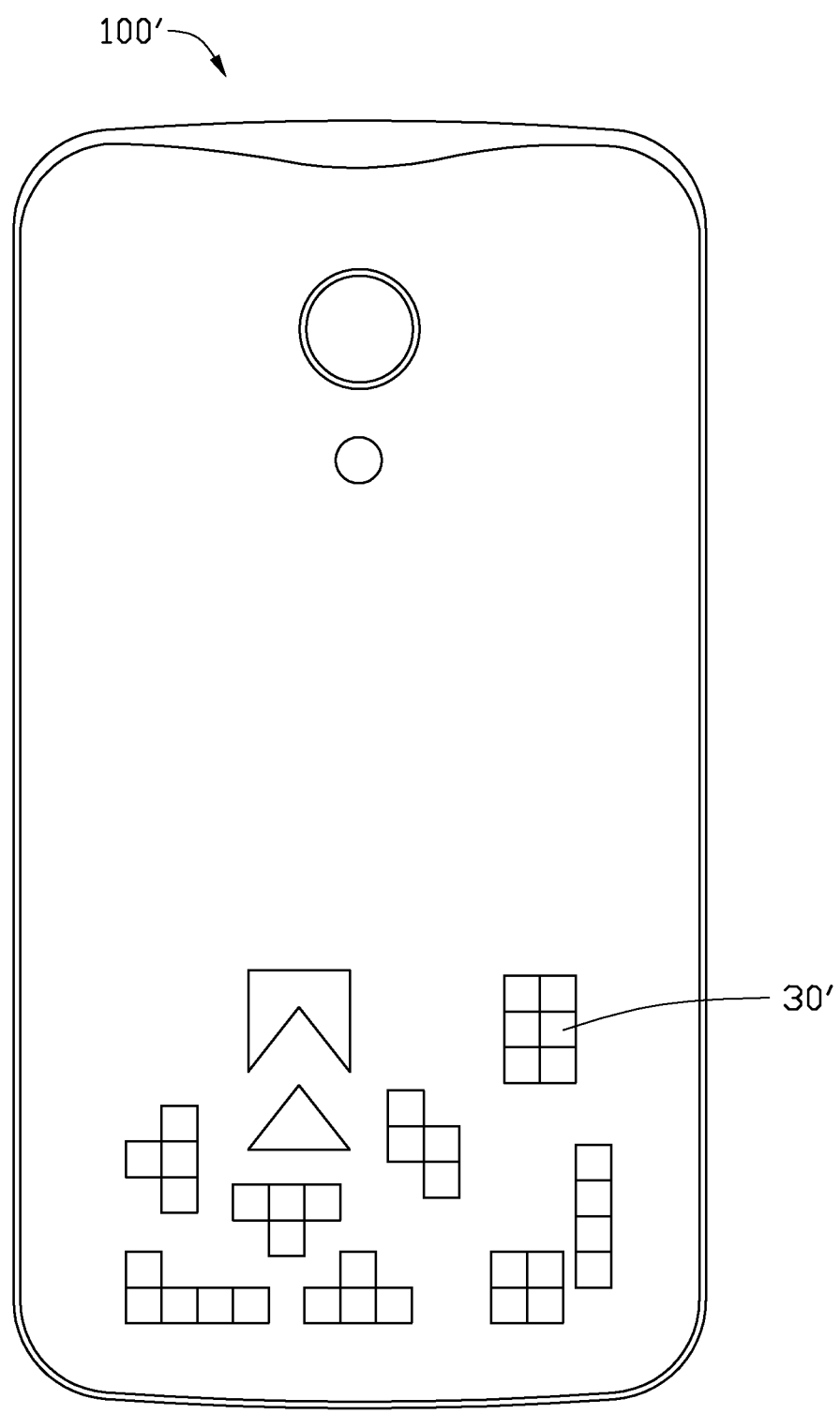
FIG. 4 is a diagrammatic view of a housing, according to a second exemplary embodiment.

FIG. 4 shows a diagrammatic view of a housing 100', according to a second exemplary embodiment. The housing 100' is substantially similar to the housing 100 of the first exemplary embodiment. The differences are that metal patterns 30' of the housing 100' have different shapes from each other and gaps between the metal patterns 30 are different. In practice, it should be insured that the first, second, and third antennas 210, 230, 250 are completely covered or partially covered by the metal patterns 30' and the corresponding insulating fillers 50. In addition, sizes of each metal pattern 30' and widths of the gaps can be adjusted to reduce the shielding effect of the housing 100'.

Figure 5:
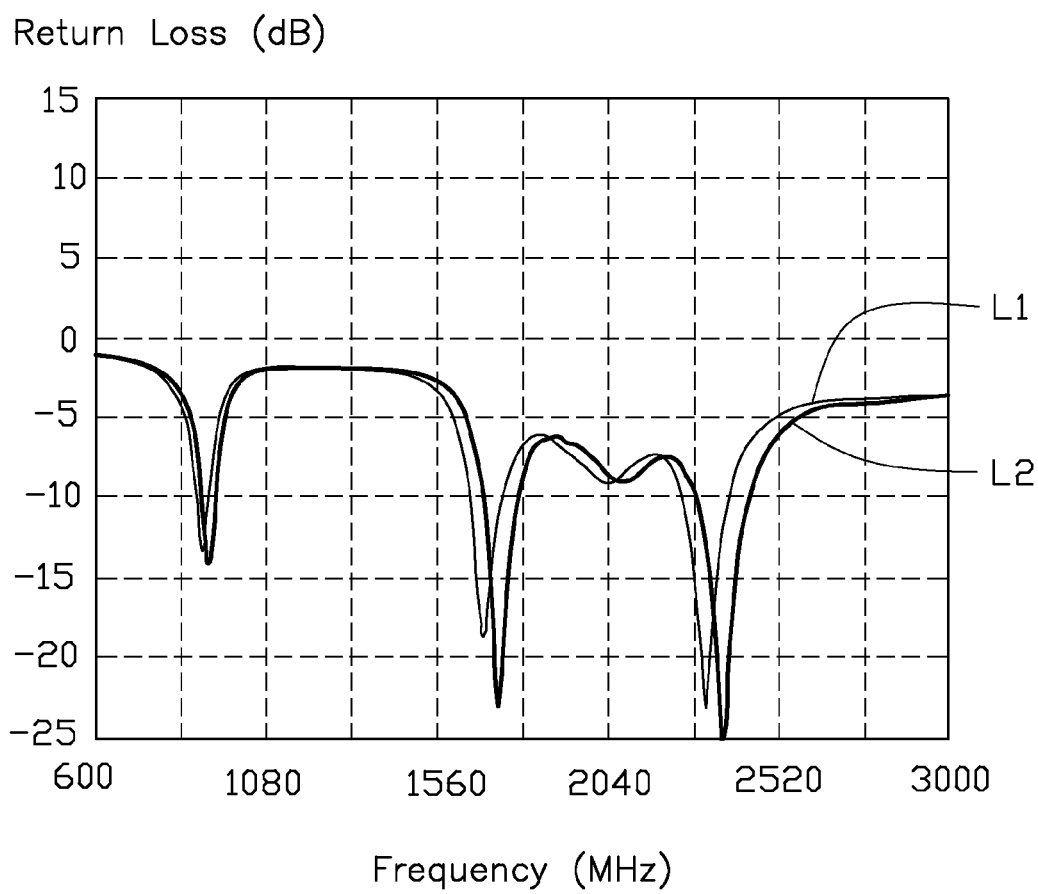
FIG. 5 is a diagram showing return loss (RL) measurements of the electronic device of FIG. 3 and an electronic device using a housing made of nonmetal material.

The curves L1 and L2 shown in FIG. 5 denote return loss of the first antenna 210 of the electronic device 200 using the housings 100, 100' and return loss of the first antenna 210 of the electronic device 200 using a housing made of nonmetal material, respectively. According to test results shown in FIG. 5, the return loss of the first antenna 210 of the electronic device 200 using the housings 100, 100' is substantially consist with the return loss of the first antenna 210 of the electronic device 200 using a housing made of nonmetal material. That is the housings 100, 100' has relative small negative influence to the return loss of the first antenna 210.

Figure 6:
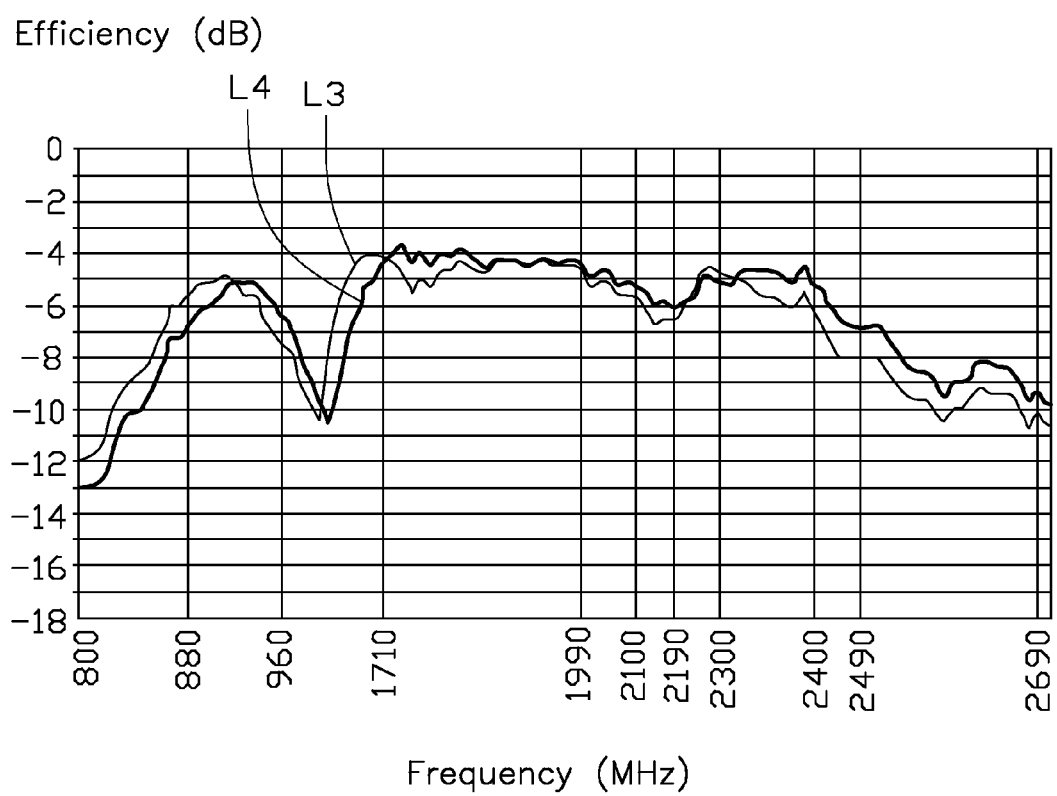
FIG. 6 is a diagram showing radiation efficiency measurements of the electronic device of FIG. 3 and an electronic device using a housing made of nonmetal material.

The curves L3, and L4 shown in FIG. 6 denote radiation efficiency of the first antenna 210 of the electronic device 200 using the housings 100, 100' and radiation efficiency of the first antenna 210 of the electronic device 200 using a housing made of nonmetal material, respectively. According to test results shown in FIG. 5, the radiation efficiency of the first antenna 210 of the electronic device 200 using the housings 100, 100' is substantially consist with the radiation efficiency of the first antenna 210 of the electronic device 200 using a housing made of nonmetal material. That is the housings 100, 100' has a relative small negatively influence to the radiation efficiency of the first antenna 210.

Similarly, the housings 100, 100' also has a relative small negative influence to the return loss and the radiation efficiency of the second and third antennas 230, 250.

In the first and second exemplary embodiments, the metal patterns 30 and 30' are formed on periphery or an end of the base 10. In other embodiment, the metal patterns 30 and 30' can be formed on other portion of the base 10.

The housing 100 employs the metal patterns 30 formed on the base 10 via cutting and employs the insulating fillers 50 to fill the gaps between the metal patterns 30. The sizes of each metal pattern 30 and the widths of the gaps can be adjusted to reduce the shielding effect of the housing 100 so that the electronic device 200 can have a metal appearance and a better radiation performance.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A housing comprising:
   a conductive metal base;
   a plurality of metal patterns formed on the base, the plurality of metal patterns spaced from each other; and
   a plurality of insulating fillers, each of the plurality of insulating fillers situated between two adjacent metal patterns of the plurality of metal patterns.

2. The housing of claim 1, wherein each metal pattern has a length less than or equal to 15 mm and a width less than or equal to 10 mm.

3. The housing of claim 1, wherein every two adjacent metal patterns defines a gap, a width of the gap is at least 1 mm.

4. The housing of claim 1, wherein each metal pattern is substantially one of rectangular and ellipse.

5. The housing of claim 1, wherein each metal pattern is formed on one of periphery and an end of the base.

6. An electronic device comprising:
   a housing, comprising:
   a conductive metal base;
   a plurality of metal patterns formed on a first surface of the base, each of the plurality of metal patterns spaced from each other; and
   a plurality of insulating fillers, each insulating filler of the plurality of insulating fillers disposed between two adjacent metal patterns of the plurality of metal patterns; and
   at least one antenna positioned on a second surface of the base and covered by at least one of the plurality of metal patterns and at least one of the plurality of insulating fillers.

7. The electronic device of claim 6, wherein each metal pattern has a length less than or equal to 15 mm and a width less than or equal to 10 mm.

8. The electronic device of claim 7, wherein every two adjacent metal patterns defines a gap, a width of the gap is at least 1 mm.

9. The electronic device of claim 8, wherein each metal pattern is substantially one of rectangular and ellipse.

10. The electronic device of claim 9, wherein each metal pattern is formed on one of periphery and an end of the base.

11. The electronic device of claim 6, wherein the second surface of the base is opposite to the first surface of the base and the electronic device comprises a plurality of antennas secured to the second surface of the base.

* * * * *